(12) United States Patent
Steinmetz

(10) Patent No.: US 11,027,456 B2
(45) Date of Patent: Jun. 8, 2021

(54) CERAMIC COMPOSITE

(71) Applicant: SHILDAN, INC., Mount Laurel, NJ (US)

(72) Inventor: Moshe Steinmetz, Mount Laurel, NJ (US)

(73) Assignee: Shildan, Inc., Mount Laurel, NJ (US)

( * ) Notice: Subject to any disclaimer, the term of this patent is extended or adjusted under 35 U.S.C. 154(b) by 247 days.

(21) Appl. No.: 15/773,451

(22) PCT Filed: Nov. 4, 2016

(86) PCT No.: PCT/US2016/060460
§ 371 (c)(1),
(2) Date: May 3, 2018

(87) PCT Pub. No.: WO2017/079517
PCT Pub. Date: May 11, 2017

(65) Prior Publication Data
US 2018/0326614 A1    Nov. 15, 2018

Related U.S. Application Data

(60) Provisional application No. 62/251,331, filed on Nov. 5, 2015.

(51) Int. Cl.
| | | |
|---|---|---|
| B28B 11/24 | (2006.01) | |
| B28B 3/20 | (2006.01) | |
| B28B 11/04 | (2006.01) | |
| C04B 35/628 | (2006.01) | |
| B28B 1/00 | (2006.01) | |
| F27B 9/24 | (2006.01) | |
| C04B 33/32 | (2006.01) | |
| F27B 9/02 | (2006.01) | |

(52) U.S. Cl.
CPC ............ B28B 11/243 (2013.01); B28B 1/002 (2013.01); B28B 3/20 (2013.01); B28B 11/044 (2013.01); C04B 33/32 (2013.01); C04B 35/628 (2013.01); F27B 9/028 (2013.01); F27B 9/2407 (2013.01)

(58) Field of Classification Search
CPC .................................................... B28B 11/243
See application file for complete search history.

(56) References Cited

U.S. PATENT DOCUMENTS

| | | | | |
|---|---|---|---|---|
| 702,661 A | 6/1902 | Locke | | |
| 1,592,979 A | 7/1926 | Keeler | | |
| 2,241,169 A | * | 5/1941 | Yokes | ........................ E04B 1/12 |
| | | | | 52/223.7 |
| 2,628,088 A | * | 2/1953 | Austin | ..................... C21D 9/70 |
| | | | | 432/76 |
| 3,224,629 A | * | 12/1965 | Cummings | ............. B28B 11/02 |
| | | | | 220/710.5 |
| 4,312,385 A | * | 1/1982 | Magera | ................... F27D 3/022 |
| | | | | 138/147 |

(Continued)

*Primary Examiner* — Nathaniel Herzfeld
(74) *Attorney, Agent, or Firm* — Dilworth & Barrese, LLP

(57) ABSTRACT

A composite ceramic element and method of firing clay or ceramic elements in a roller kiln, comprising the steps of passing a first ceramic element on rollers through the roller kiln, passing a second ceramic element on rollers through the roller kiln, and mating and securing the first and second ceramic elements together after passing each said ceramic element through the roller kiln.

28 Claims, 10 Drawing Sheets

1. TERRACOTTA NESTED BAGUETTES
2. INNER TUBE
3. END PLATE

(56) References Cited

U.S. PATENT DOCUMENTS

| | | | | | |
|---|---|---|---|---|---|
| 4,532,745 | A | * | 8/1985 | Kinard | E04B 2/8629 52/251 |
| 4,957,685 | A | * | 9/1990 | Boot | B28B 19/0053 264/261 |
| 5,198,164 | A | * | 3/1993 | Hayashi | C04B 33/32 264/606 |
| 5,248,255 | A | * | 9/1993 | Morioka | F27B 9/2407 432/127 |
| 5,566,517 | A | * | 10/1996 | Ishii | E04C 2/526 52/309.12 |
| 6,267,066 | B1 | | 7/2001 | Schickling et al. | |
| 7,823,858 | B2 | * | 11/2010 | Matsufuji | B28B 7/183 249/149 |
| 2011/0091730 | A1 | | 4/2011 | Hoppe et al. | |
| 2015/0377554 | A1 | * | 12/2015 | Smith | F27D 1/12 266/193 |

\* cited by examiner

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

CERAMIC COMPOSITE

BACKGROUND OF THE INVENTION

The present invention relates to improved extruding, glazing and firing of clay or ceramic elements. More particularly, the present invention relates to an improved ceramic element which can be extruded, glazed and fired without damaging the outer surface thereof.

Clay or ceramic elements have been fired in a kiln by passing therealong on rollers. One side of such clay or ceramic elements has production marks interfering with providing smooth outer surfaces upon firing, or becomes undesirably roughened by passing through the kiln on rollers. Furthermore, providing unique shapes of such elements was limited because not all such configurations could stably pass through the kiln on rollers.

For example, the bottom surfaces of the prior art ceramic elements illustrated in FIGS. 10 and 11 could not be successfully glazed because these surfaces rested against the rollers while passing through the kiln. Uneven surfacing was especially a problem with the prior art ceramic having the curved surfaces illustrated in FIG. 11, because these elements tend to rock while passing along the rollers in the kiln, resulting in uneven firing and subsequent glazing.

The present invention solves these disadvantages by versatilely firing the ceramics without damaging the outer surfaces thereof.

SUMMARY OF THE INVENTION

Accordingly, it is an object to improve, extruding, glazing and firing of clay or ceramic elements, to provide undamaged outer surfaces thereof.

These and other objects are attained by the present invention which is directed to a composite having pair of clay or ceramic elements mating and secured together in complementary fashion after being individually passed on rollers through a kiln. The outer surface(s) of the composite is glazed either before or after firing in the kiln, in any event before securing the individual elements together. After extrusion, the individual ceramic elements are advanced through the kiln on rollers. Previously, it was not possible to successfully glaze the surfaces of the ceramic before or after passing along the rollers, because this surface was unduly roughened. Moreover, ceramics designed to have irregular outer surfaces, e.g., curved, V-shaped, rippled or corrugated, could not be stably balanced and passed along the rollers through the kiln to ensure comprehensive uniform extrusion, glazing and firing along all surfaces.

With the present invention it is now possible to successfully extrude, glaze and fire the ceramic in a kiln without damaging the outer surface thereof, to provide a uniform ceramic. The inner surface of each element contacting the rollers in the kiln now bears the production marks and does not interfere with smoothing or glazing the outer surface of the composite formed thereby.

BRIEF DESCRIPTION OF THE DRAWINGS

The present invention will be described in greater detail with reference to the accompanying drawings in which FIG. 1 schematically illustrates an end view of a first embodiment according to the present invention, FIG. 2 schematically illustrates an end view of a second embodiment according to the present invention, FIG. 3 schematically illustrates an end view of a third embodiment according to the present invention, FIG. 4 schematically illustrates an end view of a fourth embodiment according to the present invention, FIG. 5 schematically illustrates an end view of a fifth embodiment according to the present invention, FIG. 6 schematically illustrates an end view of a sixth embodiment according to the present invention, FIG. 7 schematically illustrates an end view of a seventh embodiment according to the present invention, FIG. 8 schematically illustrates an end view of an eighth embodiment according to the present invention.

DESCRIPTION OF THE PREFERRED EMBODIMENTS

Figure 1:
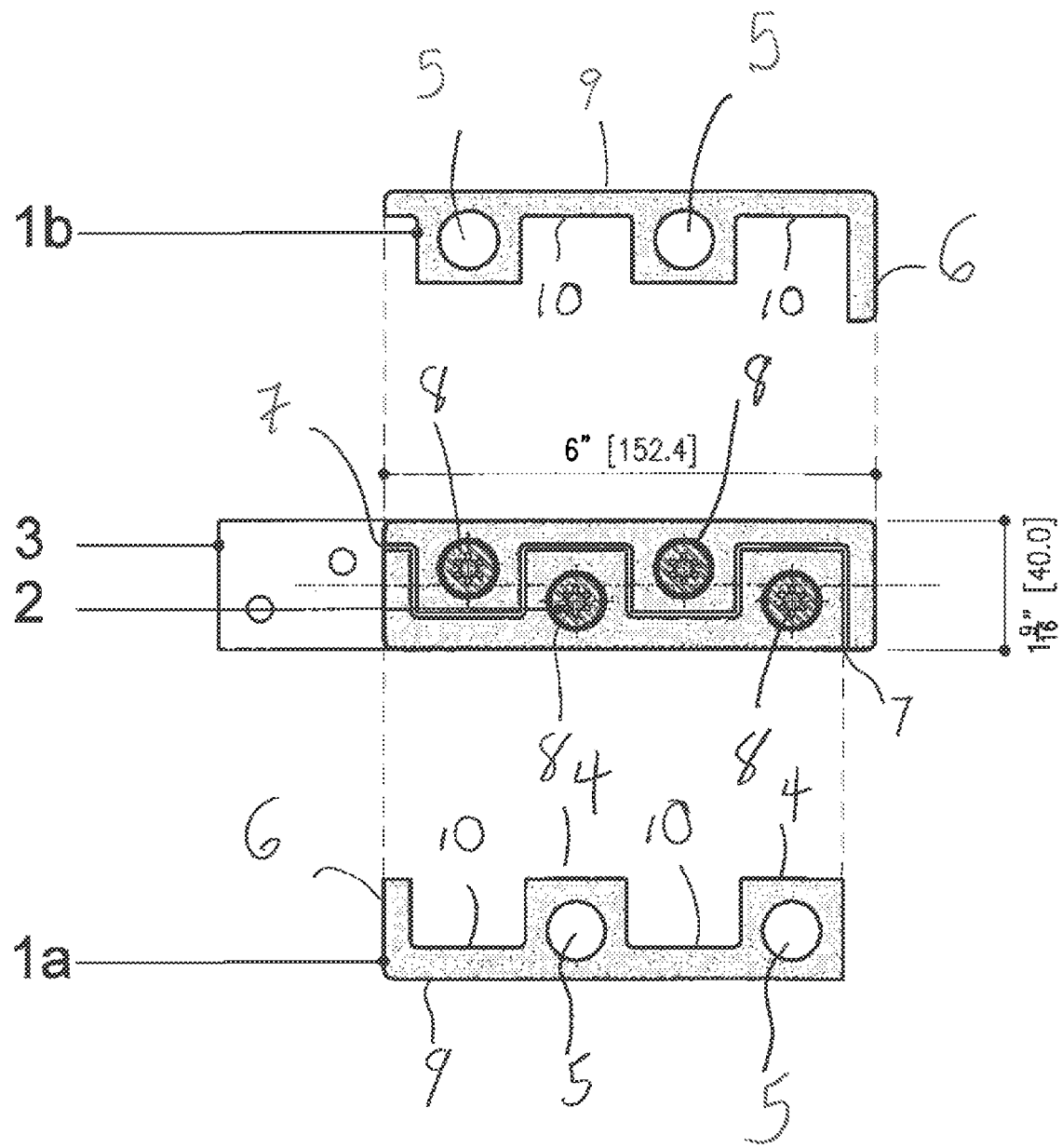
Figure 9:
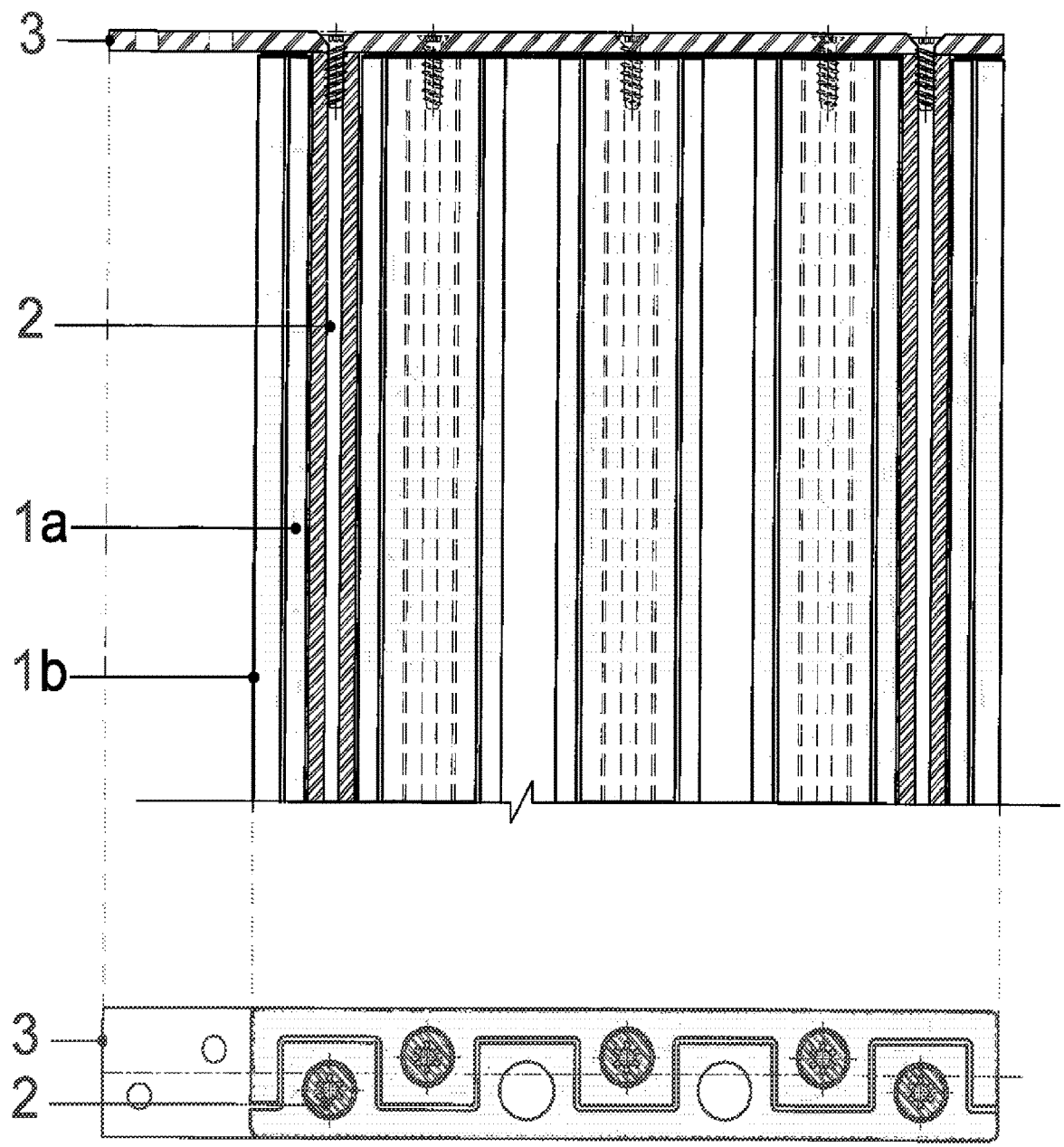
FIG. 9 illustrates a top sectional view of the embodiment illustrated in FIG. 2, and FIGS. 10 and 11 illustrate end views of the prior art.
Figure 10:
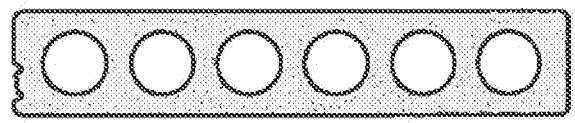
Figure 11:
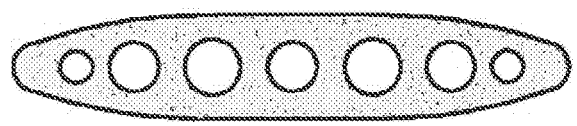

Referring to the drawings, FIG. 1 illustrates one embodiment in which the two complementarily-shaped ceramic elements 1*a*, 1*b* each have two plateaus 4 each in the shape of a substantially rectangular parallelepiped and having a cylindrical opening 5 therethrough, and a protruding edge 6 in the shape of a substantially rectangular parallelepiped along one side thereof. The outer opposite surfaces 9 of the ceramic elements 1*a*, 1*b* are flat after being secured together, and with the joint 7 between the elements formed at perpendicular edges after the elements are secured together. The inner tube 2 is inserted into the cylindrical openings, with the end plate 3 being secured against a lateral edge of the elements 1*a*, 1*b* by the screws 8 as illustrated, in turn securing the complementary-shaped elements together (best seen in the top view illustrated in FIG. 9 with respect to the embodiment illustrated in FIG. 2 infra).

The side of each said element opposite the flat outer surface 9 thereof, i.e., the inner surface having the respective plateaus 4 and valleys 10 therebetween, is rested against the rollers when passing through the kiln. One of the elements, e.g., element 1*b*, is then inverted to be secured to element 1*a*. The drawings also indicate preferred dimensions in inches and millimeters (in brackets) of the composite element after being secured together. The composite element can have different sizes with different dimensions in similar proportions to one another.

Figure 2:
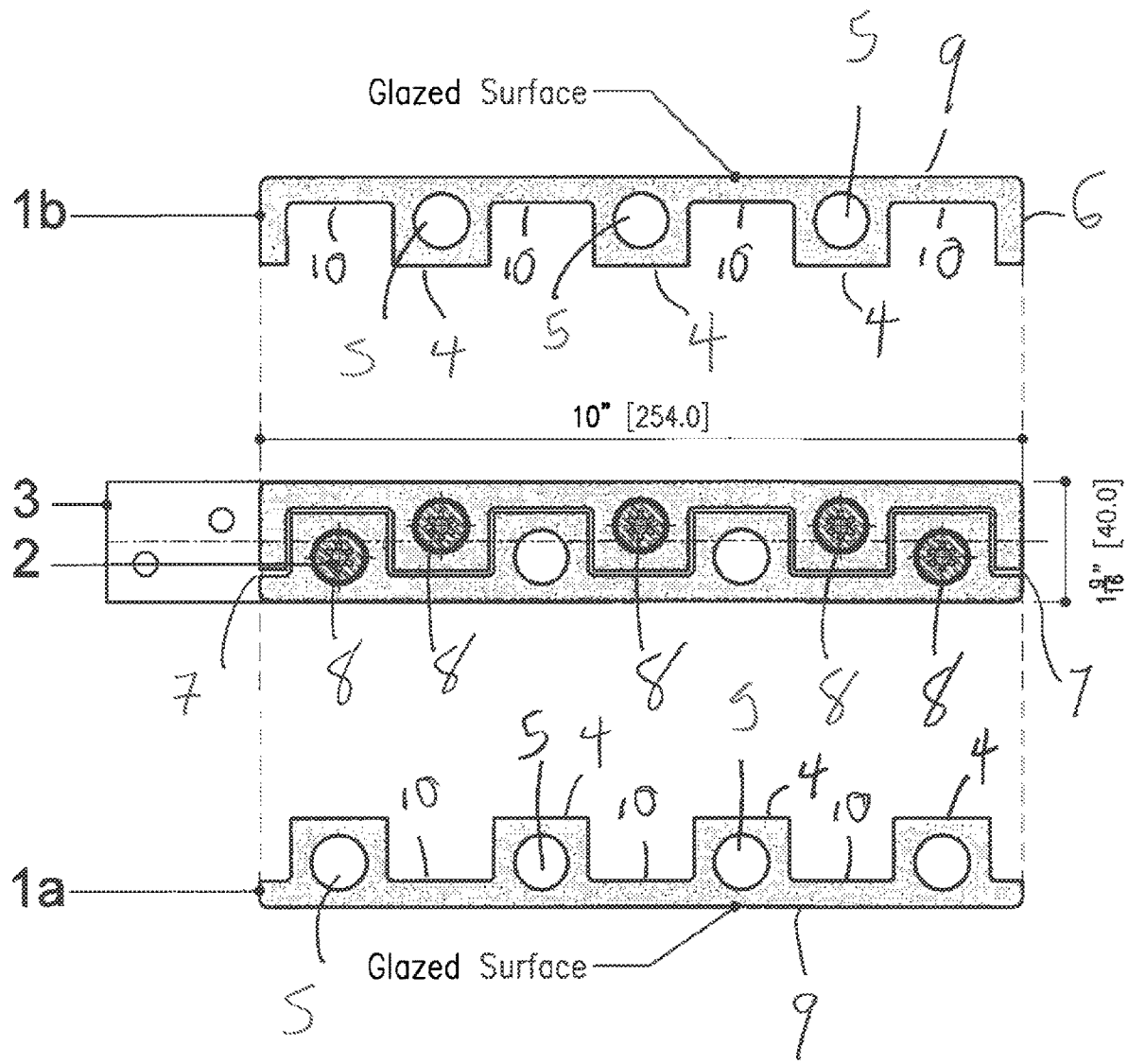

FIG. 2 illustrates one embodiment in which one 1*a* of the complementarily-shaped ceramic elements 1*a*, 1*b* has four plateaus 4 each in the shape of a substantially rectangular parallelepiped and having a cylindrical opening 5 therethrough, and the other element 1*b* has three plateaus 4 each in the shape of a substantially rectangular parallelepiped and having a cylindrical opening 5 therethrough, and two protruding edges each in the shape of a substantially rectangular parallelepiped along opposite sides thereof. The outer opposite surfaces 9 of the ceramic elements 1*a*, 1*b* are also flat after being secured together, with the joint 7 between the elements formed at opposite lateral edges 11 of the composite after the elements are secured together.

FIG. 2 illustrates glazing of the outer surfaces 9 of the composite before or after each element 1*a*, 1*b* has passed through the kiln and before the elements are secured together to form the composite.

Figure 3:
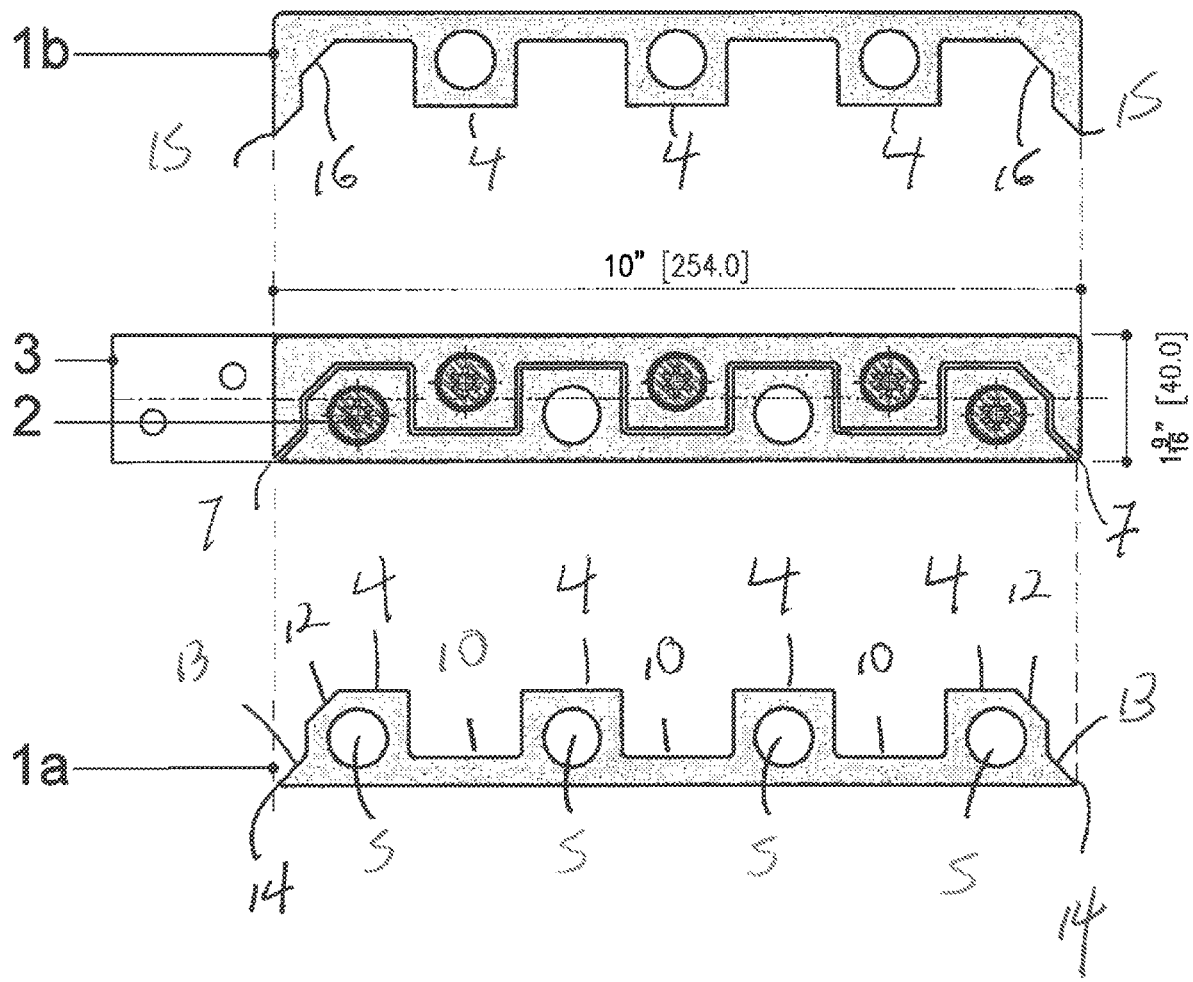

FIG. 3 illustrates one embodiment in which one 1*a* of the elements 1*a*, 1*b* has four plateaus 4 each in the shape of a substantially rectangular parallelepiped and having a cylindrical opening 5 therethrough, with two outer plateaus each having a chamfer 12 extending outwardly towards an edge 14 of the joint, and with edges 13 of said element 1a on outer sides of the two outer plateaus also inclined toward the edge of the joint (e.g., in zigzag fashion). The other element 1b has three plateaus 4 each in the shape of a substantially rectangular parallelepiped and having a cylindrical opening 5 therethrough, and two protruding edges each in the shape of a substantially rectangular parallelepiped along opposite sides thereof and having an inner zig-zag surface 16 angled outwardly towards the edge 15 of the joint. The composite has flat outer surfaces 9 after the elements are secured together, and with the joint 7 formed at corners on the same side of the composite.

The individual elements 1a, 1b are formed by extrusion in a die, prior to firing in a kiln. In this regard, the zig-zag edges formed by chamfer 12 and edges 13, 14 of element 1a can be formed by machining or cutting with a tool after extrusion or even after firing, with zig-zag surfaces 16 and edges 15 of element 1b also formed by machining or cutting with a tool after extrusion or even after firing. For example, the elements 1a, 1b shown in the embodiment illustrated in FIG. 2 can be machined to form the zig-zag corners in the embodiment illustrated in FIG. 3.

Figure 4:
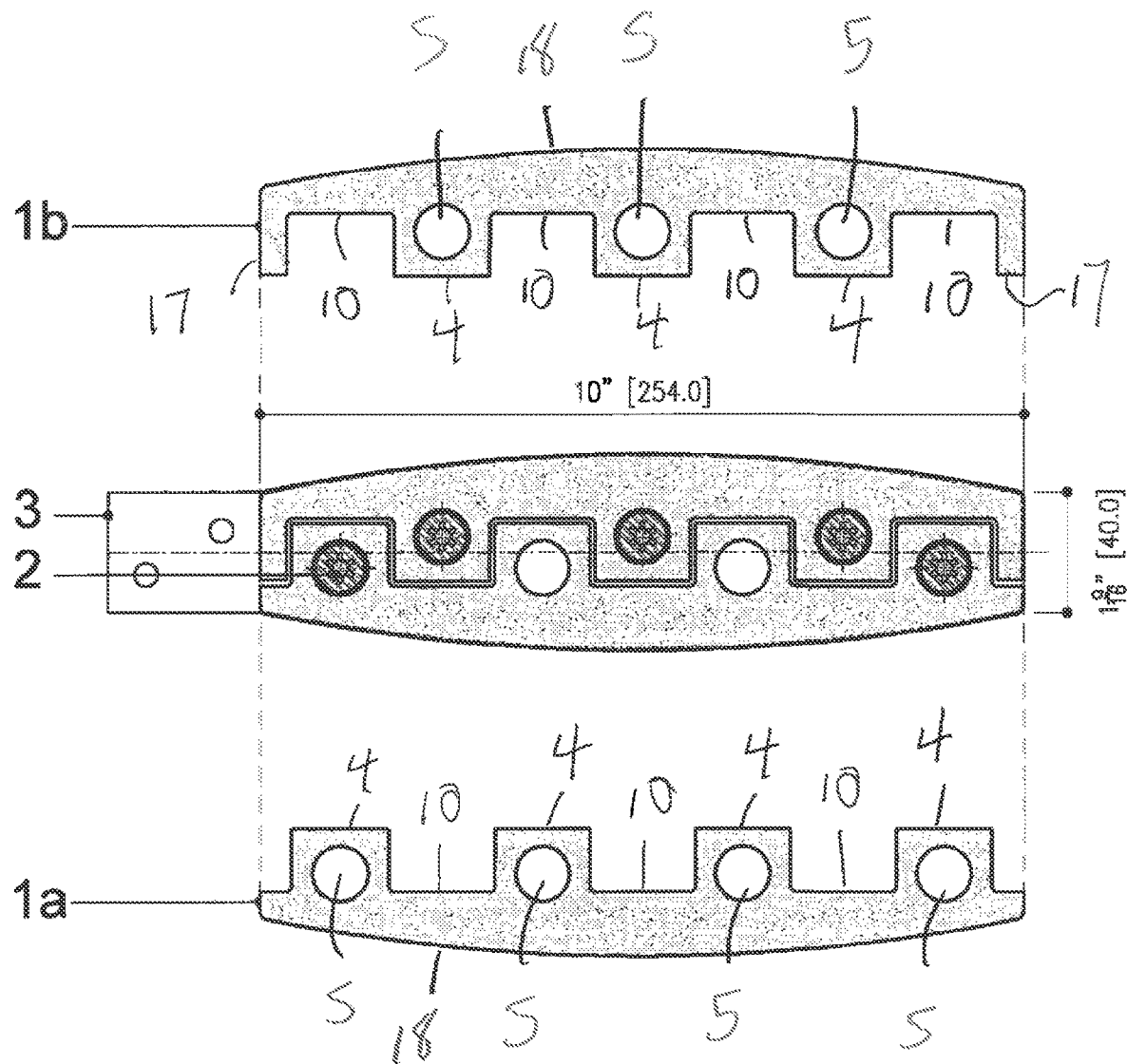

FIG. 4 illustrates one embodiment in which one 1a of the elements 1a, 1b has four plateaus 4 each in the shape of a substantially rectangular parallelepiped and having a cylindrical opening 5 therethrough, and the other 1b element has three plateaus 4 each in the shape of a substantially rectangular parallelepiped and having a cylindrical opening 5 therethrough, and two protruding edges 17 each in the shape of a substantially rectangular parallelepiped along opposite sides thereof.

The composite has convexly-shaped opposite surfaces 18 after the elements are secured together, with the joint 7 formed at opposite lateral edges of the elements 1a, 1b. These surfaces 18 are inherently unstable when passing along rollers in the kiln. However, the present embodiment, which positions the opposite internal surface having the plateaus 4 of each composite element 1a, 1b against the rollers, ensures these curved surfaces 18 are smoothly, uniformly fired within the kiln and subsequently glazed.

Figure 5:
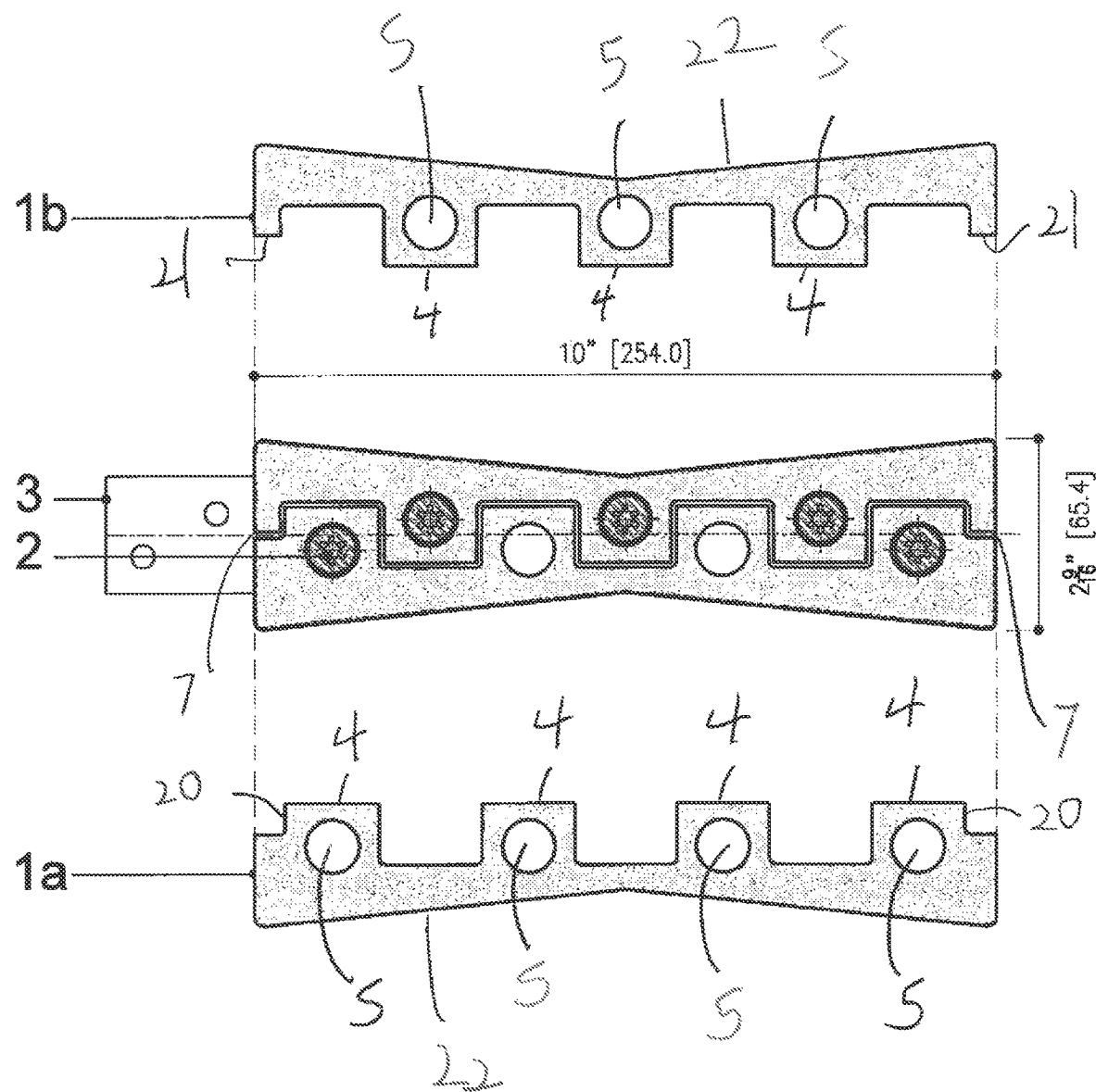

FIG. 5 illustrates one embodiment in which one 1a of the elements 1a, 1b has four plateaus 4 each in the shape of a substantially rectangular parallelepiped and having a cylindrical opening 5 therethrough. The two outer plateaus each have a longer inner lateral side 19 and shorter outer lateral side 20, designed to facilitate mating with the other element 1b. The other element 1b has three plateaus 4 each in the shape of a substantially rectangular parallelepiped and having a cylindrical opening 5 therethrough, and two protruding edges 21 each in the shape of a substantially rectangular parallelepiped along opposite sides thereof.

The composite has substantially V-shaped opposite surfaces 22 after the elements are secured together, with the joint 7 formed at opposite lateral edges of the elements. As with the embodiment illustrated in FIG. 4 supra, these surfaces are also inherently unstable when passing along rollers in the kiln. However, the present embodiment, which also positions the opposite internal surface having the plateaus 4 of each composite element 1a, 1b against the rollers, ensures these surfaces 22 are smoothly, uniformly fired within the kiln and subsequently glazed.

Figure 6:
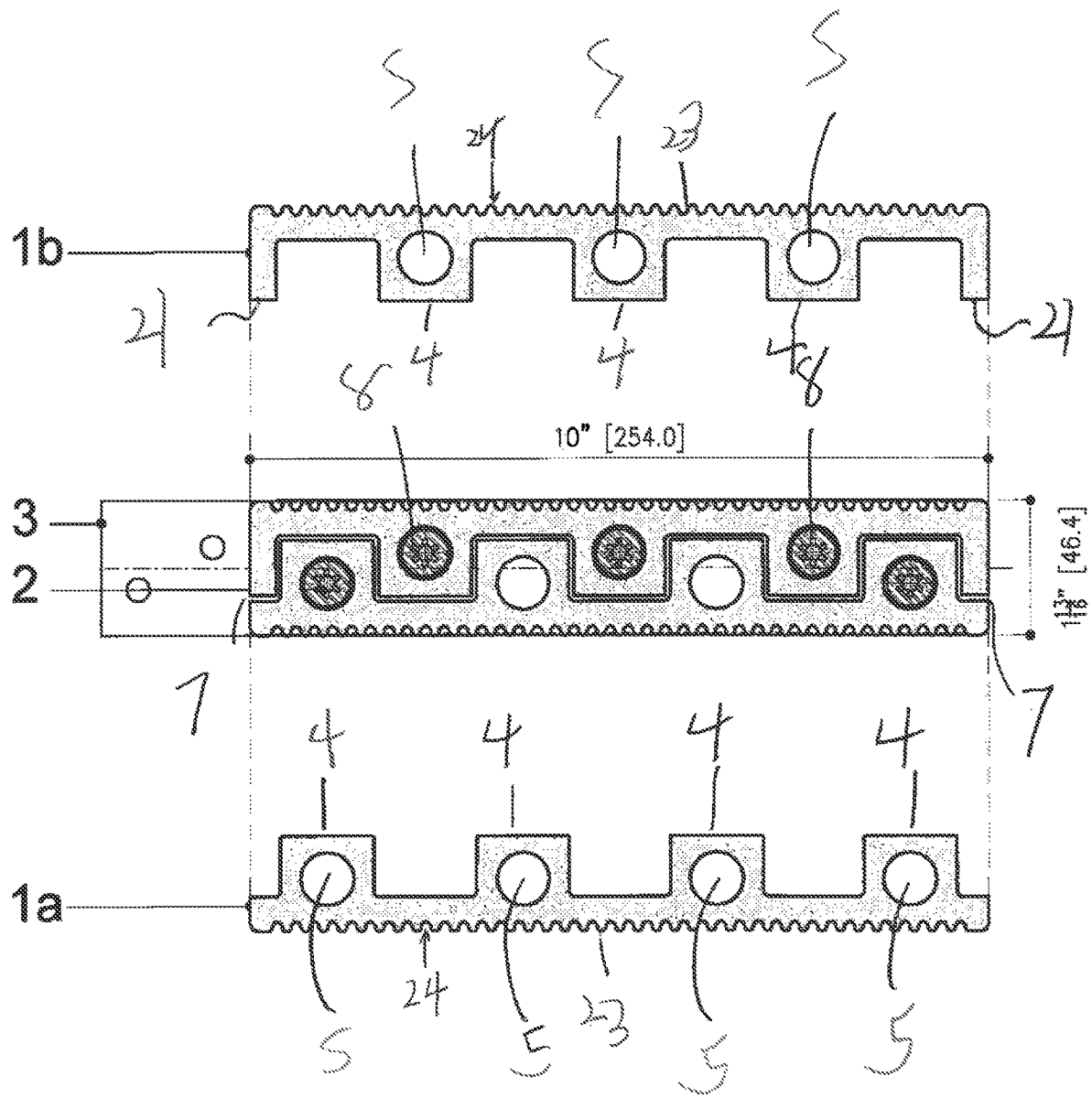

FIG. 6 illustrates one embodiment in which one 1a of the elements 1a, 1b has four plateaus 4 each in the shape of a substantially rectangular parallelepiped and having a cylindrical opening 5 therethrough, and the other element 1b has three plateaus 4 each in the shape of a substantially rectangular parallelepiped and having a cylindrical opening 5 therethrough, and two protruding edges 21 each in the shape of a substantially rectangular parallelepiped along opposite sides thereof.

The composite has rippled or corrugated opposite surfaces 23 after the elements are secured together, with the joint 7 formed at opposite lateral edges of the elements. The trenches 24 formed between the ripples or corrugations were normally ruined by contacting the rollers during firing. However, as with the illustrated embodiments supra, the present embodiments prevents these trenches 24 from being ruined by positioning the opposite, internal surfaces having the plateaus 4 of each ceramic component against the rollers when firing.

Figure 7:
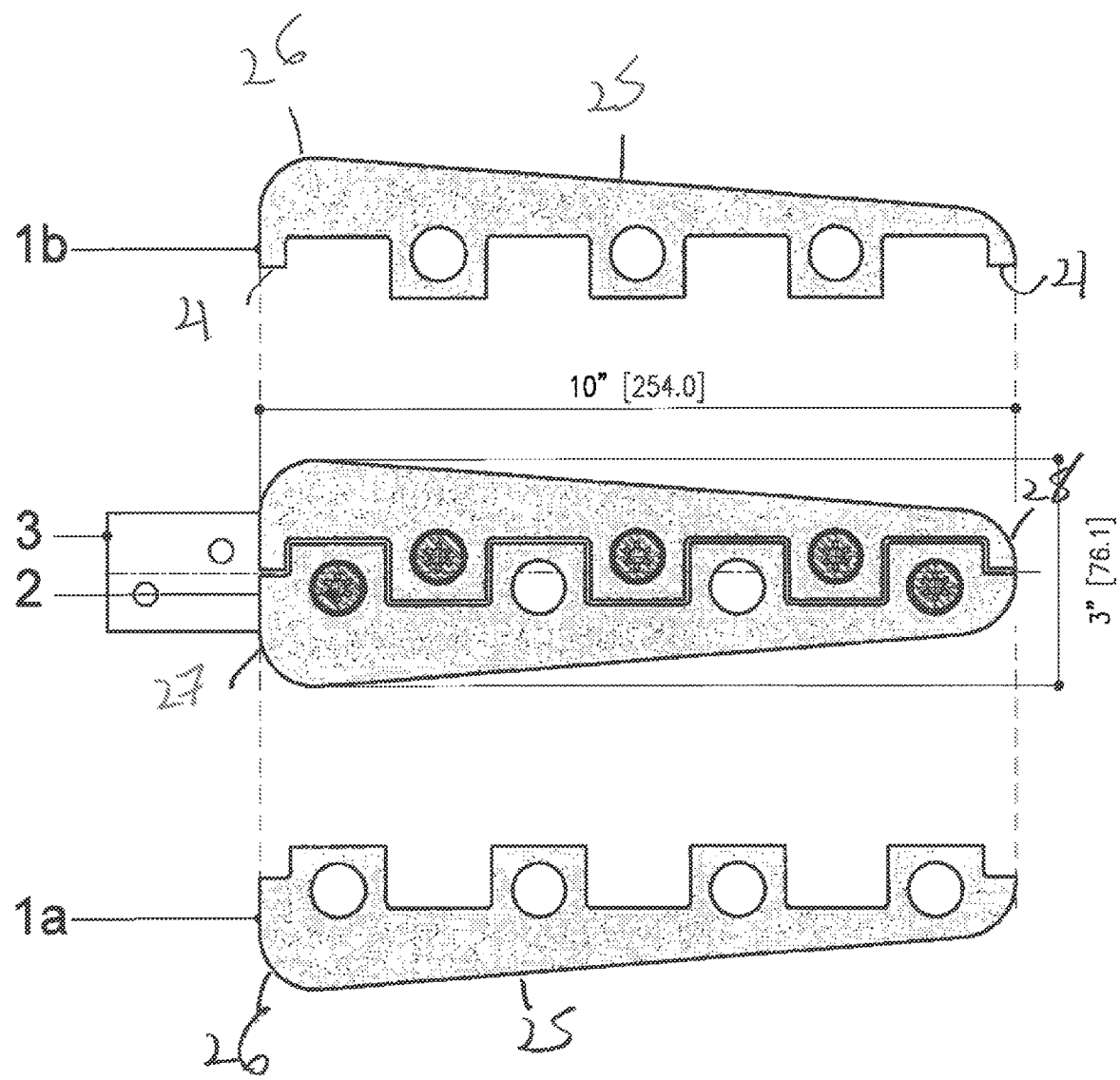

FIG. 7 illustrates one embodiment in which one 1a of the elements 1a, 1b has four plateaus 4 each in the shape of a substantially rectangular parallelepiped and having a cylindrical opening 5 therethrough, and the other element 1b has three plateaus 4 each in the shape of a substantially rectangular parallelepiped and having a cylindrical opening 5 therethrough. The outer surfaces 25 of the respective elements 1a, 1b are asymmetrically slanted as illustrated, to form a bulge or protrusion 26 at one end thereof, these bulges or protrusions 26 situated diametrically opposite one another as illustrated when the elements 1a, 1b are fastened together.

In the element 1a having four plateaus 4, the plateau remote from the bulge or protrusion 26 has a longer lateral side than the plateau immediately adjacent the bulge or protrusion 26, with the element 1b having three plateaus 4 having two protruding edges 21 each in the shape of a substantially rectangular parallelepiped along opposite sides thereof.

The composite has asymmetrically inclined opposite surfaces 25 after the elements are secured together, with the joint 7 formed at opposite lateral edges of the elements, i.e., between the large and small curved lateral ends 27, 28 as illustrated. As with the embodiments illustrated in FIGS. 4 and 5 supra, these surfaces are also inherently unstable when passing along rollers in the kiln. However, the present embodiment, which also positions the opposite internal surface having the plateaus 4 of each composite element 1a, 1b against the rollers, ensures these surfaces 25 are smoothly, uniformly fired within the kiln and subsequently glazed.

Figure 8:
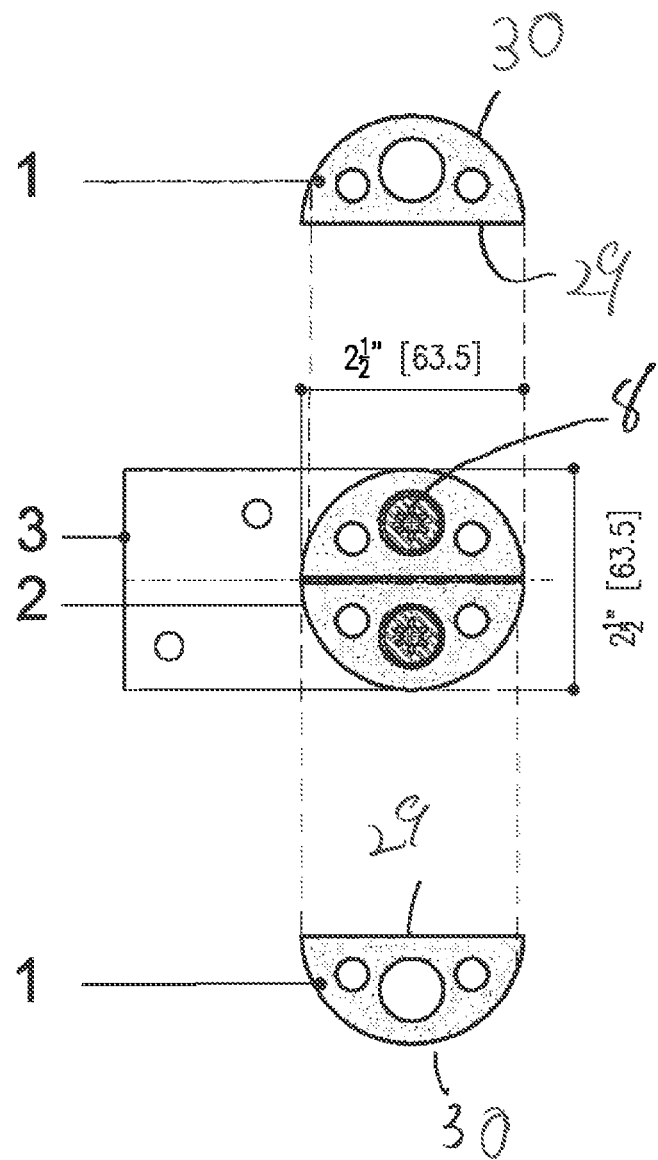

FIG. 8 illustrates one embodiment in which the elements 1 are essentially identical and each are in the shape of a semi-cylinder having a flat inner surface 29, an curved outer surface 30 and holes 5 for receiving tubes 2 and screws 7. As with the other embodiments described supra, the flat inner surfaces 29 are placed against the rollers in the kiln to be stably passed therethrough for firing, ensuring uniform, undamaged glazing of the outer curved surfaces 30.

The glaze is brushed on a smooth surface or combed onto a rough surface (e.g., FIG. 6). The ceramic elements are each fired in the kiln at temperatures of about 1100° C.-1200° C. for several hours a day. The tube 2 and plate 3 are each made of aluminum or stainless steel, while each element is ceramic or terra cota.

While the ceramic elements have been illustration having cylindrical openings, different shapes of such openings (e.g., square or rectangular cross-section) are also acceptable.

The preceding description of the present invention is merely exemplary and not intended to limit the scope thereof.

What is claimed is:

1. A method of firing clay or ceramic elements in a roller kiln, comprising the steps of separately extruding a pair of first and second ceramic elements to each have a plurality of protruding plateaus and adjacent recesses, with said protruding plateaus each in the shape of a substantially rectangular parallelepiped and adjacent recesses substantially in the same shape, passing the first ceramic element on rollers through the roller kiln, passing the second ceramic element on rollers through the roller kiln, and mating and securing the first and second ceramic elements together by interlocking the respective plateaus and recesses, after passing each said ceramic element through the roller kiln, such that a lateral edge defined by said interlocking plateaus and recesses being substantially flat, and said elements defining top, bottom, front, back and lateral surfaces when interlocked, with said front and back surfaces being substantially flat and parallel to one another, and said lateral surfaces being substantially flat and parallel to one another, to define a noncircular shape when said elements are interlocked.

2. The method of claim 1, wherein the first and second ceramic elements are secured together along surfaces that rested against the rollers when passing through the roller kiln.

3. The method of claim 2, comprising the additional step of glazing at least one surface of the first and second ceramic elements before being secured together.

4. The method of claim 3, wherein opposite surfaces are glazed of the first and second ceramic elements before being secured together.

5. The method of claim 4, wherein each said surface of the first and second ceramic elements being glazed is opposite the surface of the respective first and second ceramic element that rested against the rollers when passing through the roller kiln.

6. The method of claim 1, wherein the first and second ceramic elements are secured together to form a joint therebetween.

7. The method of claim 1, wherein the first and second ceramic elements are each secured together by the steps of inserting an inner tube in an opening along a respective ceramic element, positioning an end plate against a lateral edge of said first and second ceramic elements, and inserting fastening devices through openings in the end plate and into the inner tubes situated in the respective openings in the first and second ceramic elements.

8. The method of claim 7, wherein the fastening devices are screws.

9. The method of claim 1, wherein the edges of the first and second ceramic elements are machined or cut with a tool after extrusion and prior to and/or after firing.

10. A pair of clay or ceramic elements configured to mate and be secured together by interlocking in complementary fashion after being individually passed on rollers through a kiln, said elements each comprising a plurality of protruding plateaus each in the shape of a substantially rectangular parallelepiped and adjacent recesses substantially in the same shape, said elements configured to mate with respective plateaus and recesses of the other element when interlocking with one another, a lateral edge defined by said interlocking plateaus and recesses being substantially flat, and said elements defining top, bottom, front, back and lateral surfaces when interlocked, with said front and back surfaces being substantially flat and parallel to one another, and said lateral surfaces being substantially flat and parallel to one another, to define a noncircular shape when said elements are interlocked.

11. The elements of claim 10, wherein at least one surface is glazed after the elements are secured together.

12. The elements of claim 11, wherein two opposite surfaces are glazed after the elements are secured together.

13. The elements of claim 10, wherein each said element comprises at least one opening, and additionally comprising an inner tube positioned in at least one of the openings of each said element, an end plate against a lateral edge of said elements, and fastening devices for securing the end plate to the elements through the inner tubes situated in the respective openings in the elements.

14. The elements of claim 13, wherein the fastening devices are screws.

15. The elements of claim 10, wherein the elements form a joint therebetween when secured together.

16. The elements of claim 15, wherein the joint is formed at perpendicular edges of the elements.

17. The elements of claim 15, wherein the joint is formed at opposite lateral edges of the elements.

18. The elements of claim 15, wherein the joint is formed at corners on the same side of the elements.

19. The elements of claim 10 having convex opposite surfaces when secured together.

20. The elements of claim 10 having substantially V-shaped opposite surfaces when secured together.

21. The elements of claim 10 having rippled or corrugated opposite surfaces when secured together.

22. The elements of claim 16, wherein each said element comprises two plateaus each in the shape of a substantially rectangular parallelepiped and having an opening therethrough, and a protruding edge in the shape of a substantially rectangular parallelepiped along one side thereof.

23. A pair of clay or ceramic elements configured to mate and be secured together in complementary fashion after being individually passed on rollers through a kiln, wherein the elements form a joint therebetween when secured together, which is formed at opposite lateral edges or corners on the same side of the elements, or the elements each have asymmetrically inclined surfaces opposite surfaces configured to mate with one another, one of said elements comprises four plateaus each in the shape of a substantially rectangular parallelepiped and having an opening therethrough, and the other of said elements comprises three plateaus each in the shape of a substantially rectangular parallelepiped and having an opening therethrough, and two protruding edges each in the shape of a substantially rectangular parallelepiped along opposite sides thereof.

24. A pair of clay or ceramic elements configured to mate and be secured together in complementary fashion after being individually passed on rollers through a kiln, wherein the elements have convex, substantially V-shaped or rippled or corrugated opposite surfaces when secured together, one of said elements comprises four plateaus each in the shape of a substantially rectangular parallelepiped and having an opening therethrough, and the other of said elements comprises three plateaus each in the shape of a substantially rectangular parallelepiped and having an opening therethrough, and two protruding edges each in the shape of a substantially rectangular parallelepiped along opposite sides thereof.

25. The elements of claim 10, wherein
the elements each have asymmetrically inclined surfaces opposite surfaces configured to mate with one another.

26. The elements of claim 13, wherein said opening is provided through one of the plateaus.

27. The elements of claim 26, wherein said elements each comprise a protruding edge along one side thereof and extending in the direction of said opening, and
said protruding edges extending to different length from one another in a direction perpendicular to the opening.

28. A pair of clay or ceramic elements configured to mate and be secured together by interlocking in complementary fashion after being individually passed on rollers through a kiln,
said elements each comprising a plurality of protruding plateaus each in the shape of a substantially rectangular parallelepiped and adjacent recesses substantially in the same shape,
said elements configured to mate with respective plateaus and recesses of the other element when interlocking with one another, and
a lateral edge defined by said interlocking plateaus and recesses being substantially flat, wherein
said elements each comprise a protruding edge along one side thereof, and
said protruding edges extending to different length from one another.

* * * * *